UNITED STATES PATENT OFFICE.

RICHARD KOTHE, OF VOHWINKEL, NEAR ELBERFELD, AND OSCAR DRESSEL, OF ELBERFELD, GERMANY, ASSIGNORS TO SYNTHETIC PATENTS CO., INC., OF NEW YORK, N. Y., A CORPORATION OF NEW YORK.

AZO DYES.

1,126,489.   Specification of Letters Patent.   Patented Jan. 26, 1915.

No Drawing.   Application filed January 5, 1914.   Serial No. 810,471.

*To all whom it may concern:*

Be it known that we, RICHARD KOTHE and OSCAR DRESSEL, doctors of philosophy, chemists, citizens of the German Empire, residing at Vohwinkel, near Elberfeld, and Elberfeld, Germany, respectively, have invented new and useful Improvements in Azo Dyes, of which the following is a specification.

We have found that new and valuable azo dyestuffs can be obtained by coupling a diazo compound with an aminonaphthol compound in which the amino group is substituted by a residue of a sulfonyl-ortho-oxycarboxylic acid.

The new coloring matters dye wool from an acid bath in orange to violet pure shades which after treated with chromates change into bluer tints remarkable for their excellent fastness to milling and washing. They are after being dried and pulverized generally from reddish to brownish-red powders soluble in water and in concentrated sulfuric acid generally with a reddish to brownish-coloration. They yield upon reduction with stannous chlorid and hydrochloric acid an aromatic amino compound and a diaminonaphthol derivative which contains in one amino group a residue of a sulfonyl-phenolcarboxylic acid.

In order to illustrate the new process more fully the following example is given, the parts being by weights:—9.3 parts of anilin are diazotized with 6.9 parts of sodium nitrite and 8 parts of hydrochloric acid and the diazo solution is added while being stirred to a solution of 52 parts of the product obtained from the sulfonylchlorid of salicylic acid and 1.8-aminonaphthol-3.6-disulfonic acid:

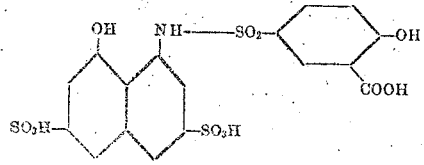

containing soda in excess. When the diazo compound can no longer to be proved to be in the mixture, the dyestuff is salted out, filtered off and dried. It yields on wool from an acid bath pure red shades, after chromed they are bluer and very fast to washing and to milling. Printed on cotton with acetate of chromium a pure bluish-red very fast to washing is obtained. The new dye is after being dried and pulverized in the shape of its sodium salt a reddish powder soluble in water and in concentrated sulfuric acid with a reddish coloration. Upon reduction with stannous chlorid and hydrochloric acid anilin and salicylsulfonyl-1.7-diamino-8-naphthol-3.6-disulfonic acid are obtained. It has in a free state the formula:

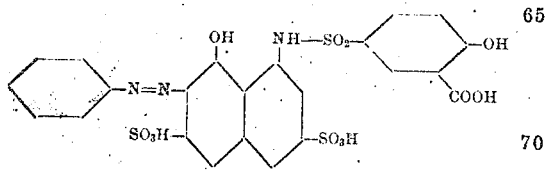

Other diazo compounds can be used, *e. g.* those derived from 2.5-dichloroanilin, meta-nitranilin, ortho-anisidin, ortho-toluidin, 3-chloro-2-toluidin, 4-nitro-2-toluidin, acetyl-para-phenylenediamin, anthranilic acid, aminoazobenzene, aminoazobenzene-monosulfonic acid, benzidin, para-para-diamino-diphenylurea, 1-naphthylamin-4-sulfonic acid, 1-naphthylamin-5-sulfonic acid, the intermediate compound from benzidin and salicylic acid, etc. In the same way other of the above mentioned amino-naphthol compounds may be used such as salicylsulfonyl-1.7-aminonaphthol, salicylsulfonyl-2.7-aminonaphthol, salicylsulfonyl-1.5-aminonaphthol-7-sulfonic acid, salicylsulfonyl-1.8-aminonaphthol-4-sulfonic acid, salicylsulfonyl-1.8-aminonaphthol-6-sulfonic acid, salicylsulfonyl-2.5-aminonaphthol-7-sulfonic acid, salicylsulfonyl-2.8-aminonaphthol-6-sulfonic acid, ortho-cresotin-sulfonyl-1.8-aminonaphthol-3.6-disulfonic acid derived from the cresotin sulfonic acid of the following formula:

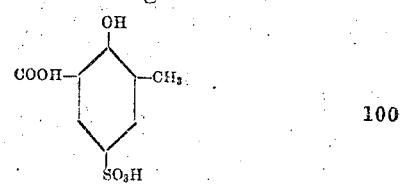

salicyl-sulfonyl-1.8-aminonaphthol-4.6-disulfonic acid etc.

We claim:—

1. The new azo dyes which are after being dried and pulverized generally from reddish to brownish-red powders soluble in water and in concentrated sulfuric acid generally with a reddish to brownish-red coloration, yielding upon reduction with stannous chlorid and hydrochloric acid an aromatic amino compound and a diaminonaphthol derivative which contains in one amino group a residue of a sulfonylphenolcarboxylic acid and dyeing wool from an acid bath generally from orange to violet pure shades which after treated with chromates change into bluer tints remarkable for their excellent fastness to milling and washing, substantially as described.

2. The new azo dyes which are after being dried and pulverized generally from reddish to brownish-red powders soluble in water and in concentrated sulfuric acid generally with a reddish to brownish-red coloration, yielding upon reduction with stannous chlorid and hydrochloric acid an aromatic amino compound and a diaminonaphthol sulfonic acid which contains in one amino group a residue of a sulfonylphenolcarboxylic acid and dyeing wool from an acid bath generally from orange to violet pure shades which after treated with chromates change into bluer tints remarkable for their excellent fastness to milling and washing, substantially as described.

3. The new azo dyes which after being dried and pulverized generally from reddish to brownish-red powders soluble in water and in concentrated sulfuric acid generally with a reddish to brownish-red coloration, yielding upon reduction with stannous chlorid and hydrochloric acid an aromatic amino compound and a diaminonaphthol derivative which contains in one amino group a salicylsulfonyl residue and dyeing wool from an acid bath generally from orange to violet pure shades which after treated with chromates change into bluer tints remarkable for their excellent fastness to milling and washing, substantially as described.

4. The new azo dyes which are after being dried and pulverized generally from reddish to brownish-red powders soluble in water and in concentrated sulfuric acid generally with a reddish to brownish-red coloration yielding upon reduction with stannous chlorid and hydrochloric acid an aromatic amino compound and a diaminonaphthol sulfonic acid which contains in one amino group a salicylsulfonyl residue and dyeing wool from an acid bath generally from orange to violet pure shades which after treated with chromates change into bluer tints remarkable for their excellent fastness to milling and washing, substantially as described.

5. The new azo dyes which are after being dried and pulverized generally from reddish to brownish-red powders soluble in water and in concentrated sulfuric acid generally with a reddish to brownish-red coloration, yielding upon reduction with a stannous chlorid and hydrochloric acid an aromatic amino compound and a diaminonaphthol disulfonic acid which contains in one amino group a residue of a sulfonylphenolcarboxylic acid and dyeing wool from an acid bath generally from orange to violet pure shades which after treated with chromates change into bluer tints remarkable for their excellent fastness to milling and washing, substantially as described.

6. The new azo dyes which are after being dried and pulverized generally from reddish to brownish-red powders soluble in water and in concentrated sulfuric acid generally with a reddish to brownish-red coloration, yielding upon reduction with stannous chlorid and hydrochloric acid an aromatic amino compound and a diaminonaphthol disulfonic acid which contains in one amino group a salicylsulfonyl residue and dyeing wool from an acid bath generally from orange to violet pure shades which after treated with chromates change into bluer tints remarkable from their excellent fastness to milling and washing, substantially as described.

7. The new azo dye having in a free state most probably the following general formula:

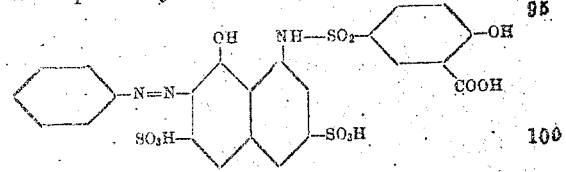

which dye is after being dried and pulverized in the shape of its sodium salt a reddish powder soluble in water and in concentrated sulfuric acid with a reddish coloration; yielding upon reduction with stannous chlorid an hydrochloric acid anilin and salicylsulfonyl-1.7-diamino-8-naphthol-3.6-disulfonic acid; and dyeing wool from an acid bath in red pure shades which after treated with chromates change into a bluer shade remarkable for its excellent fastness to milling and washing, substantially as described.

In testimony whereof we have hereunto set our hands in the presence of two subscribing witnesses.

RICHARD KOTHE.
OSCAR DRESSEL.

Witnesses:
 EVERHARD BAUMHOER,
 WALTER ABEGG.

Corrections in Letters Patent No. 1,126,489.

It is hereby certified that in Letters Patent No. 1,126,489, granted January 26, 1915, upon the application of Richard Kothe, of Vohwinkel, near Elberfeld, and Oscar Dressel, of Elberfeld, Germany, for an improvement in "Azo Dyes," errors appear in the printed specification requiring correction as follows: Page 2, line 31, after the word "which" insert the word *are;* same page, line 90, for the word "from" read *for*, and line 107, for the article "an" read *and;* and that the said Letters Patent should be read with these corrections therein, that the same may conform to the record of the case in the Patent Office.

Signed and sealed this 13th day of April, A. D., 1915.

[SEAL.]

J. T. NEWTON,
*Acting Commissioner of Patents.*